US012695192B2

(12) United States Patent
Wang et al.

(10) Patent No.: US 12,695,192 B2
(45) Date of Patent: Jul. 28, 2026

(54) COMMUNICATION DEVICE

(71) Applicant: Wistron NeWeb Corp., Hsinchu (TW)

(72) Inventors: Ri-Chang Wang, Hsinchu (TW); Yen-Tze Peng, Hsinchu (TW); Ching-Wen Chen, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 45 days.

(21) Appl. No.: 18/771,276

(22) Filed: Jul. 12, 2024

(65) Prior Publication Data

US 2025/0062534 A1 Feb. 20, 2025

(30) Foreign Application Priority Data

Aug. 17, 2023 (TW) ................................ 112130936

(51) Int. Cl.
*H01Q 1/22* (2006.01)
*H01Q 7/00* (2006.01)

(52) U.S. Cl.
CPC ............ *H01Q 7/00* (2013.01); *H01Q 1/2291* (2013.01)

(58) Field of Classification Search
CPC ........... H01Q 7/00; H01Q 1/22; H01Q 1/243; H01Q 1/38; H01Q 1/48; H01Q 5/30-35; H01Q 13/10
See application file for complete search history.

(56) References Cited

U.S. PATENT DOCUMENTS 10,454,156 B1 * 10/2019 Yang ........................ H01Q 1/48
10,910,698 B2 * 2/2021 Wei ........................ H01Q 5/357
11,095,032 B2 * 8/2021 Tseng ..................... H01Q 13/10
11,469,512 B2 * 10/2022 Lai ....................... H01Q 13/106
2014/0118204 A1 5/2014 Gavilan

* cited by examiner

*Primary Examiner* — Hasan Islam
(74) *Attorney, Agent, or Firm* — McClure, Qualey & Rodack, LLP

(57) ABSTRACT

A communication device includes a metal mechanism element, a loop radiation element, a first radiation element, and a second radiation element. The metal mechanism element has a slot. The loop radiation element is coupled to the metal mechanism element. The first radiation element has a feeding point. The first radiation element is coupled to a first connection point on the loop radiation element. The second radiation element is coupled to a second connection point on the loop radiation element. Both the first radiation element and the second radiation element are disposed inside the loop radiation element. An antenna structure is formed by the metal mechanism element, the loop radiation element, the first radiation element, and the second radiation element.

21 Claims, 5 Drawing Sheets

COMMUNICATION DEVICE

CROSS REFERENCE TO RELATED APPLICATIONS

This application claims priority of Taiwan Patent Application No. 112130936 filed on Aug. 17, 2023, the entirety of which is incorporated by reference herein.

BACKGROUND OF THE INVENTION

Field of the Invention

The disclosure generally relates to a communication device, and more particularly, to a communication device for covering wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to a communication device that includes a metal mechanism element, a loop radiation element, a first radiation element, and a second radiation element. The metal mechanism element has a slot. The loop radiation element is coupled to the metal mechanism element. The first radiation element has a feeding point. The first radiation element is coupled to a first connection point on the loop radiation element. The second radiation element is coupled to a second connection point on the loop radiation element. Both the first radiation element and the second radiation element are disposed inside the loop radiation element. An antenna structure is formed by the metal mechanism element, the loop radiation element, the first radiation element, and the second radiation element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
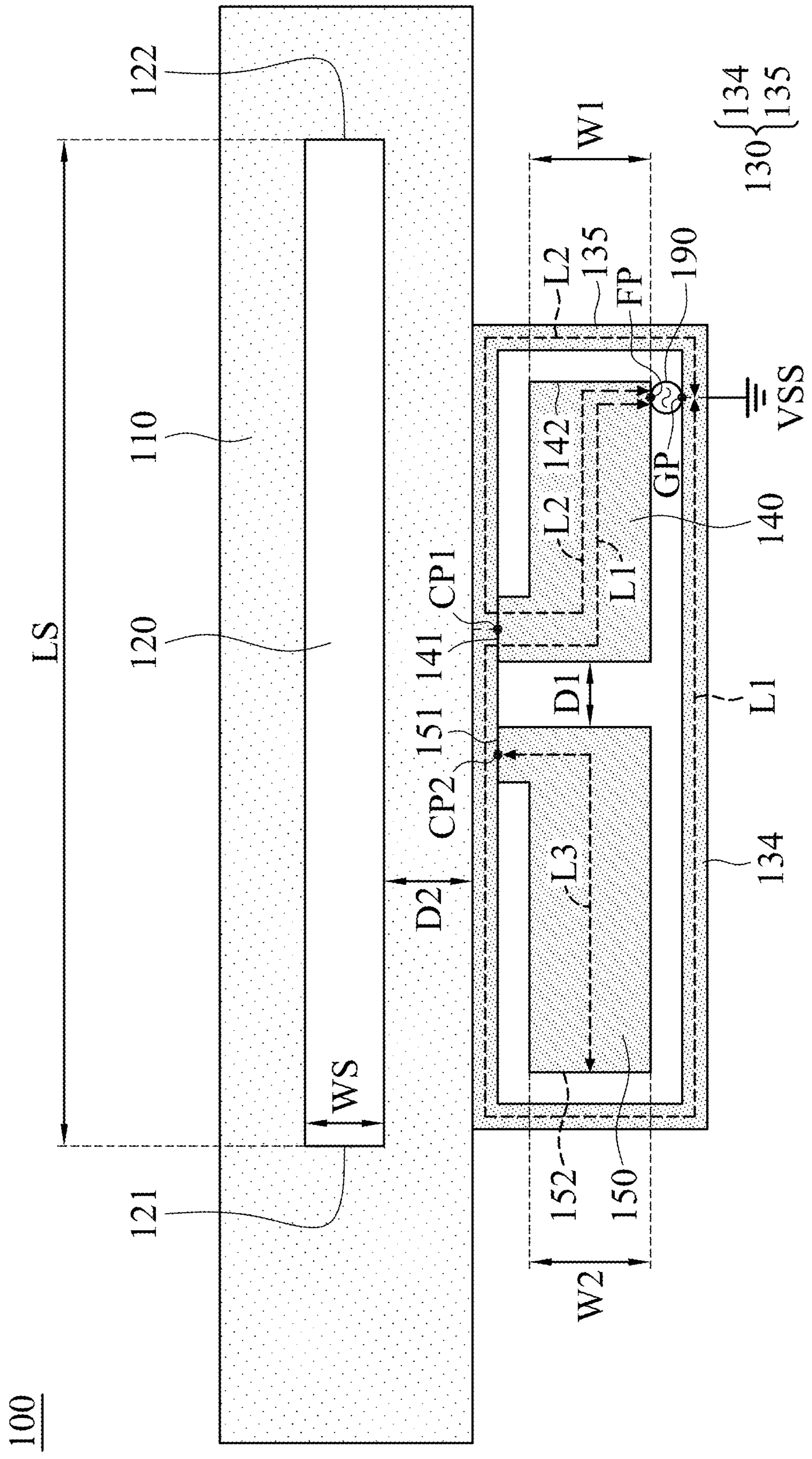
FIG. 1 is a flat view of a communication device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flat view of a communication device 100 according to an embodiment of the invention. For example, the communication device 100 may be applied to a smart phone, a tablet computer, or a notebook computer, but it is not limited thereto. In the embodiment of FIG. 1, the communication device 100 at least includes a metal mechanism element 110, a loop radiation element 130, a first radiation element 140, and a second radiation element 150. The loop radiation element 130, the first radiation element 140, and the second radiation element 150 may all be made of metal materials, such as copper, silver, aluminum, iron, or their alloys.

For example, the metal mechanism element 110 may be a metal housing, but it is not limited thereto. A slot 120 may be formed in the metal mechanism element 110. The slot 120 of the metal mechanism element 110 may substantially have a straight-line shape. Specifically, the slot 120 may be a closed slot with a first closed end 121 and a second closed end 122 away from each other. In some embodiments, the communication device 100 also includes a nonconductive material (not shown), which can fill the slot 120 of the metal mechanism element 110, so as to achieve the function of waterproof or dustproof.

The loop radiation element 130 is coupled to the metal mechanism element 110. Both the first radiation element 140 and the second radiation element 150 are disposed inside the loop radiation element 130. That is, both the first radiation element 140 and the second radiation element 150 are completely surrounded by the loop radiation element 130. In some embodiments, the loop radiation element 130 substantially has a hollow rectangular shape. In alternative embodiments, the loop radiation element 130 substantially has a hollow circular shape, a hollow square shape, or a hollow trapezoidal shape, but it is not limited thereto.

The first radiation element 140 has a first end 141 and a second end 142. The first end 141 of the first radiation element 140 is coupled to a first connection point CP1 on the loop radiation element 130. A feeding point FP is positioned at the second end 142 of the first radiation element 140. The feeding point FP may be further coupled to a positive electrode of a signal source 190. A negative electrode of the signal source 190 may be coupled to a grounding point GP on the loop radiation element 130. For example, the signal source 190 may be an RF (Radio Frequency) module. Also, the grounding point GP may be further coupled to a ground voltage VSS. In some embodiments, the first radiation element 140 substantially has a variable-width L-shape. In alternative embodiments, the first radiation element 140 substantially has a T-shape, an I-shape, or a meandering shape, but it is not limited thereto.

In some embodiments, the loop radiation element 130 is divided into a long portion 134 and a short portion 135. For example, the long portion 134 of the loop radiation element 130 may correspond to a relatively long path from the first connection point CP1 to the grounding point GP (i.e., the left-side path), and the short portion 135 of the loop radiation element 130 may correspond to a relatively short path from the first connection point CP1 to the grounding point GP (i.e., the right-side path), but they are not limited thereto.

The second radiation element 150 has a first end 151 and a second end 152. The first end 151 of the second radiation element 150 is coupled to a second connection point CP2 on the loop radiation element 130. The second end 152 of the second radiation element 150 is an open end. The second connection point CP2 is different from the first connection point CP1 as mentioned above, but they are adjacent to each other. For example, the second end 152 of the second radiation element 150 and the second end 142 of the first radiation element 140 may substantially extend in opposite directions and away from each other. In some embodiments, the second radiation element 150 substantially has a variable-width inverted L-shape. In alternative embodiments, the second radiation element 150 substantially has another T-shape, another I-shape, or another meandering shape, but it is not limited thereto.

In some embodiments, an antenna structure of the communication device 100 is formed by the metal mechanism element 110 and its slot 120, the loop radiation element 130, the first radiation element 140, and the second radiation element 150. For example, the aforementioned antenna structure may be a planar antenna structure or a 3D (Three-Dimensional) antenna structure, but it is not limited thereto.

Figure 2:
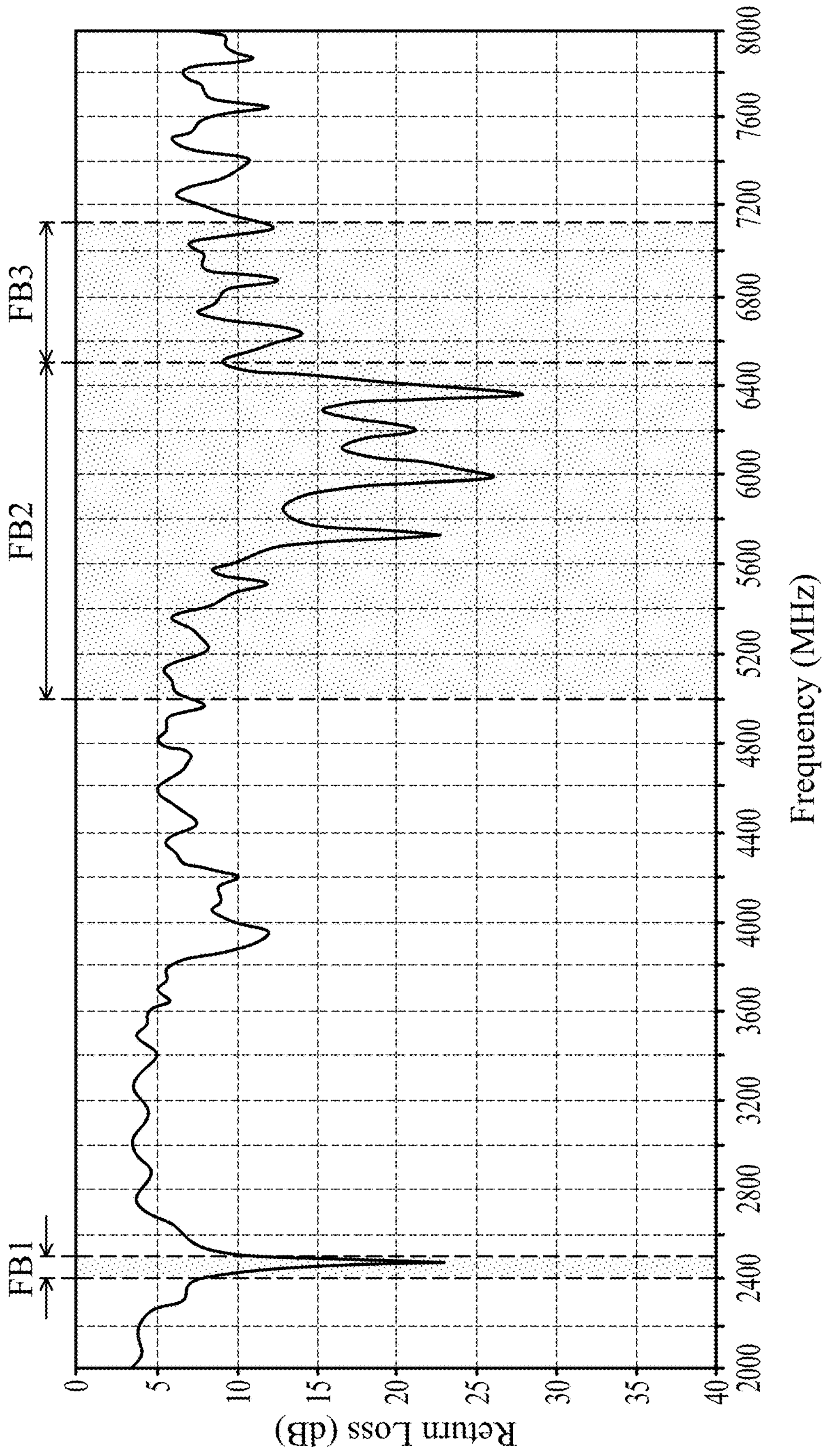
FIG. 2 is a diagram of return loss of an antenna structure of a communication device according to an embodiment of the invention.

FIG. 2 is a diagram of return loss of the antenna structure of the communication device 100 according to an embodiment of the invention. The horizontal axis represents the operational frequency (MHz), and the vertical axis represents the return loss (dB). According to the measurement of FIG. 2, the antenna structure of the communication device 100 can cover a first frequency band FB1, a second frequency band FB2, and a third frequency band FB3. For example, the first frequency band FB1 may be from 2400 MHz to 2500 MHz, the second frequency band FB2 may be from 5000 MHz to 6500 MHz, and the third frequency band FB3 may be from 6500 MHz to 7125 MHz. Therefore, the antenna structure of the communication device 100 can support at least the wideband operations of conventional WLAN (Wireless Local Area Network) and next-generation Wi-Fi 6E.

In some embodiments, the operational principles of the antenna structure of the communication device 100 will be described as follows. The slot 120 of the metal mechanism element 110 can be excited to generate a fundamental resonant mode, thereby forming the first frequency band FB1. The long portion 134 of the loop radiation element 130 and the first radiation element 140 can be excited to generate the second frequency band FB2. The slot 120 of the metal mechanism element 110 can be also excited to generate a higher-order resonant mode, thereby increasing the bandwidth of the second frequency band FB2. The short portion 135 of the loop radiation element 130 and the first radiation element 140 can be excited to generate the third frequency band FB3. According to practical measurements, the incorporation of the second radiation element 150 can provide additional current paths for the second frequency band FB2 and the third frequency band FB3, so as to increase the operational bandwidth of the antenna structure of the communication device 100.

Figure 3:
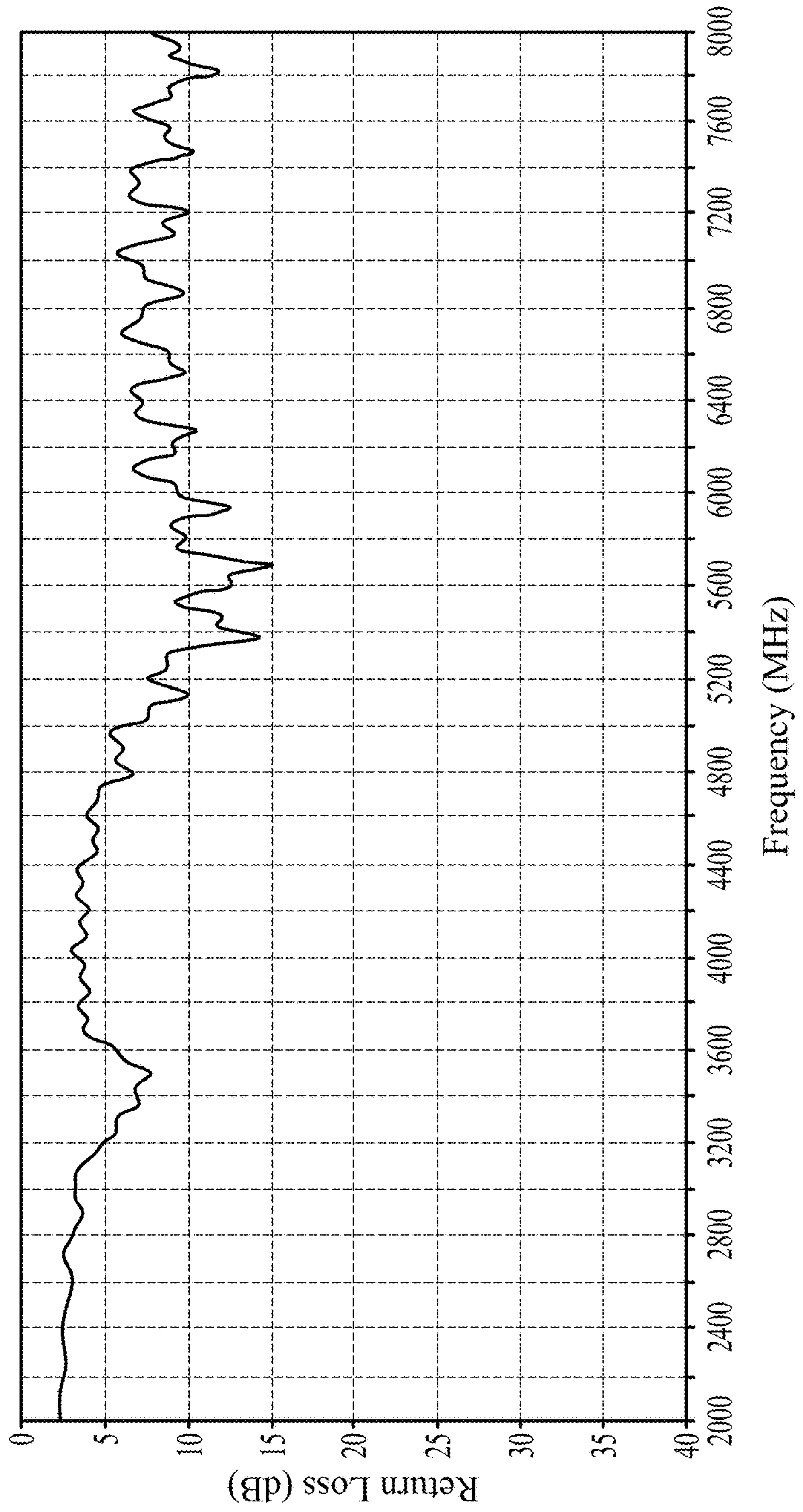
FIG. 3 is a diagram of return loss of an antenna structure of a communication device when a metal mechanism element does not have any slot.

FIG. 3 is a diagram of return loss of the antenna structure of the communication device 100 when the metal mechanism element 110 does not have the slot 120. According to the measurement of FIG. 3, if the slot 120 is removed from the metal mechanism element 110 (i.e., the metal mechanism element 100 has a complete shape), the antenna structure of the communication device 100 cannot cover the first frequency band FB1 as mentioned above.

In some embodiments, the element sizes of the communication device 100 will be described as follows. The length LS of the slot 120 of the metal mechanism element 110 may be substantially equal to 0.5 wavelength (λ/2) of the first frequency band FB1 of the antenna structure of the communication device 100. The width WS of the slot 120 of the metal mechanism element 110 may be from 3 mm to 5 mm. The total length L1 of the first radiation element 140 and the long portion 134 of the loop radiation element 130 may be from 0.25 to 0.75 wavelength (λ/4~3λ/4) of the second frequency band FB2 of the antenna structure of the communication device 100, such as about 0.5 wavelength (λ/2). The total length L2 of the first radiation element 140 and the short portion 135 of the loop radiation element 130 may be from 0.25 to 0.75 wavelength (λ/43λ/4) of the third frequency band FB3 of the antenna structure of the communication device 100, such as about 0.5 wavelength (λ/2). The width W1 of the first radiation element 140 may be from 3 mm to 5 mm. The length L3 of the second radiation element 150 may be from 5 mm to 20 mm. The width W2 of the second radiation element 150 may be from 3 mm to 5 mm. The distance D1 between the first radiation element 140 and the second radiation element 150 may be from 1 mm to 2 mm. The distance D2 between the slot 120 of the metal mechanism element 110 and the loop radiation element 130 may be from 2 mm to 4 mm. The above ranges of element sizes are calculated and obtained according to many experiment results, and they help to optimize the operational bandwidth and impedance matching of the antenna structure of the communication device 100.

The following embodiments will introduce different configurations and detailed structural features of the communication device 100. It should be understood that these figures and descriptions are merely exemplary, rather than limitations of the invention.

Figure 4:
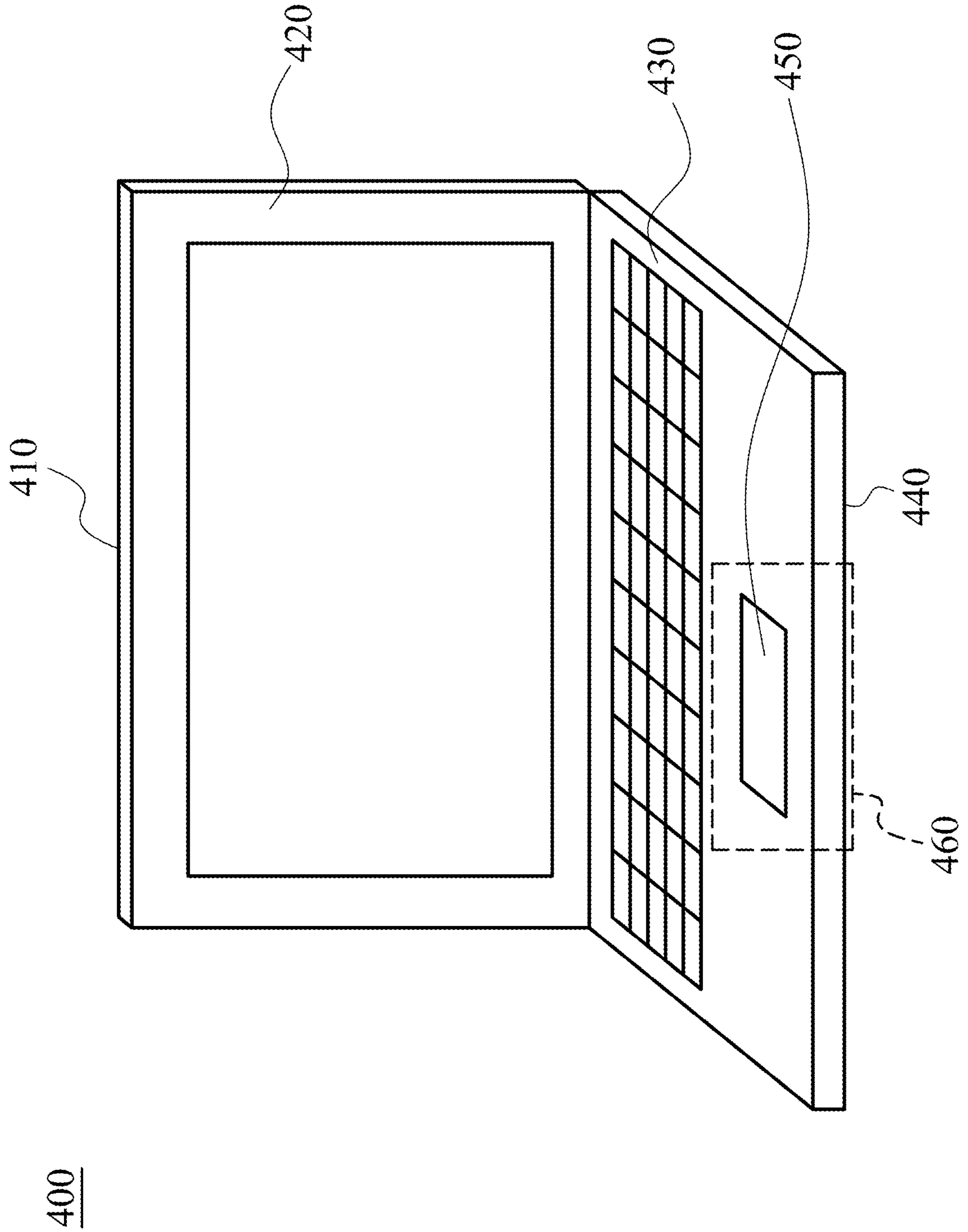
FIG. 4 is a perspective view of a communication device according to an embodiment of the invention.

FIG. 4 is a perspective view of a communication device 400 according to an embodiment of the invention. In the embodiment of FIG. 4, the communication device 400 is a notebook computer which at least includes an upper cover housing 410, a display frame 420, a keyboard frame 430, a base housing 440, and a click pad 450. It should be understood that the upper cover housing 410, the display frame 420, the keyboard frame 430, and the base housing 440 are respectively equivalent to the so-called "A-component", "B-component", "C-component" and "D-component" in the field of notebook computers. In addition, the base housing 440 may be equivalent to the metal mechanism element 110 as mentioned in the previous embodiments. The aforementioned antenna structure may be disposed at a specific position 460 of the communication device 400, which may be adjacent to the click pad 450. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

Figure 5:
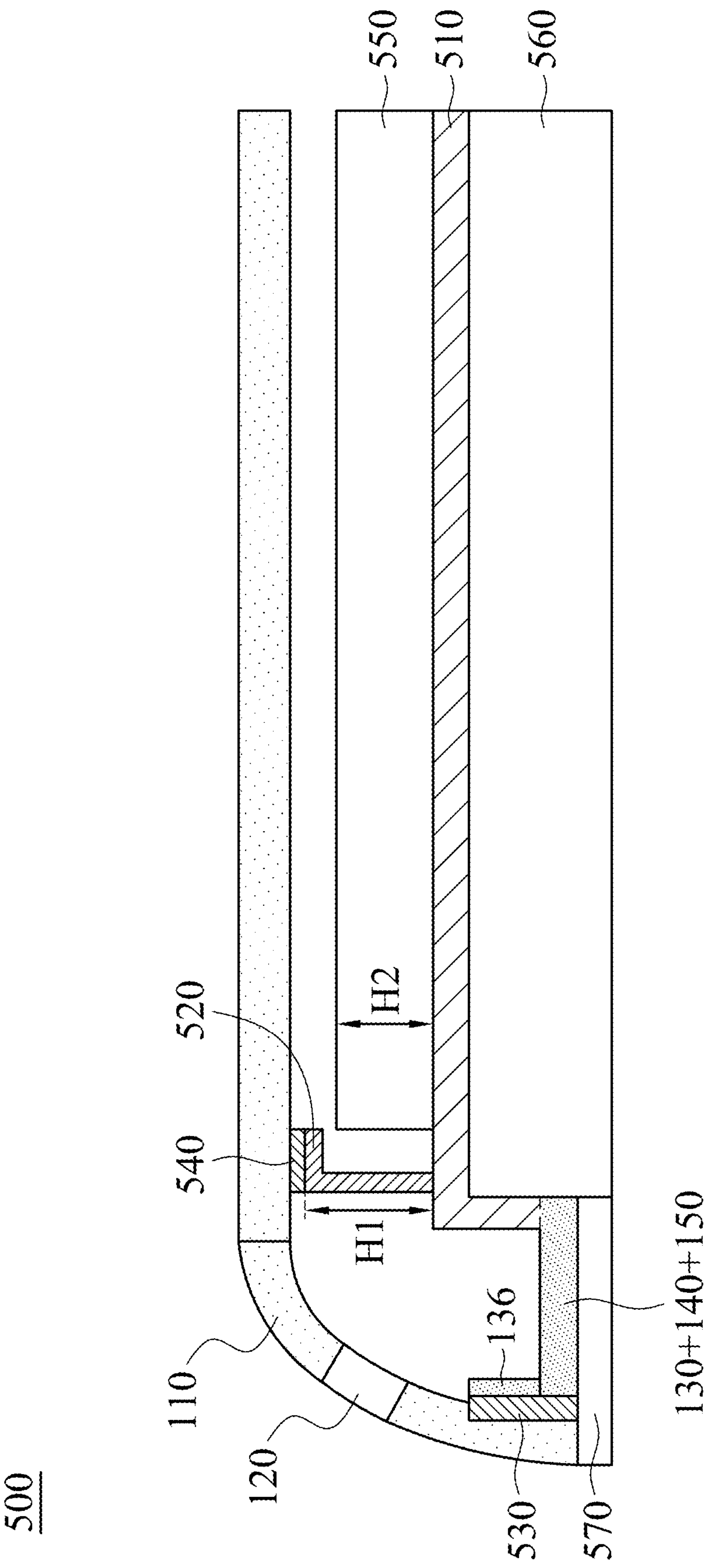
FIG. 5 is a sectional view of a communication device according to an embodiment of the invention.

FIG. 5 is a sectional view of a communication device 500 according to an embodiment of the invention. FIG. 5 is similar to FIG. 1. In the embodiment of FIG. 5, the communication device 500 further includes a click pad frame 510, a metal wall 520, a first conductive gasket 530, a second conductive gasket 540, a battery element 550, a click pad 560, and a nonconductive decorative element 570. The click pad frame 510 may be made of a metal material.

The metal wall 520 is coupled to the click pad frame 510. The loop radiation element 130 is also coupled to the click pad frame 510. The click pad frame 510 is disposed between the metal wall 520 and the loop radiation element 130. In some embodiments, an integral molding design is formed by the click pad frame 510, the metal wall 520, the loop radiation element 130, the first radiation element 140, and the second radiation element 150. For example, the above five elements may be manufactured and formed by a single metal piece after it is cut and bent. In some embodiments, the metal wall 520 extends from the click pad frame 510 toward a first direction, and the loop radiation element 130, the first radiation element 140, and the second radiation element 150 extend from the click pad frame 510 toward a second direction. The second direction may be different from or opposite to the first direction.

According to practical measurements, the incorporation of the metal wall 520 can prevent the antenna structure of the communication device 500 from experiencing interference from other nearby electronic components. Thus, the overall radiation efficiency of the communication device 500 can be significantly increased. Furthermore, since the loop radiation element 130, the first radiation element 140, and the second radiation element 150 are integrated with the click pad frame 510, the overall manufacturing cost of the communication device 500 can be further reduced.

In some embodiments, the loop radiation element 130 is coupled to the metal mechanism element 110 through the first conductive gasket 530, and the metal wall 520 is coupled to the metal mechanism element 110 through the second conductive gasket 540. The first conductive gasket 530 and the second conductive gasket 540 are used to compensate for the manufacturing tolerance of the communication device 500. Also, the loop radiation element 130 further includes a protruding portion 136 to be attached to the first conductive gasket 530. In alternative embodiments, the metal wall 520 is directed connected to the metal mechanism element 110, or is fixed onto the metal mechanism element 110 through a screw element (not shown). In other embodiments, the loop radiation element 130 is also coupled to the metal mechanism element 110 through another screw element or a spring element (not shown).

The battery element 550 can provide electric power for the communication device 500. The battery element 550 is disposed on one side (e.g., the top side) of the click pad frame 510. The battery element 550 is adjacent to the metal wall 520. For example, the height H1 of the metal wall 520 may be greater than the height H2 of the battery element 550, so as to block the relative noise from the battery element 550. For example, the height H1 of the metal wall 520 may be from 2 mm to 15 mm. In some embodiments, the vertical projection of the loop radiation element 130 does not overlap the battery element 550 at all, so as to minimize the interference caused by the battery element 550 and its relative circuit board (not shown). It should be understood that the battery element 550 is merely an optional component, which is omitted in other embodiments.

The click pad 560 is configured to receive a user input. For example, when a finger of a user touches the click pad 560, the click pad 560 can generate a corresponding input signal. The click pad 560 is disposed at an opposite side (e.g., the bottom side) of the click pad frame 510. The click pad 560 is adjacent to the loop radiation element 130. In other words, the click pad frame 510 can separate the click pad 560 from the battery element 550. In some embodiments, the click pad frame 510 is configured to support and fix the click pad 560. The vertical projection of the click pad 560 at least partially overlaps the click pad frame 510.

The nonconductive decorative element 570 may be implemented with a plastic plate. The nonconductive decorative element 570 is adjacent to the loop radiation element 130, the first radiation element 140, and the second radiation element 150. In some embodiments, the nonconductive decorative element 570 is considered as an antenna window. Thus, the relative electromagnetic waves of the loop radiation element 130, the first radiation element 140, and the second radiation element 150 can be transmitted or received through the nonconductive decorative element 570. For example, the nonconductive decorative element 570 may be substantially aligned with the loop radiation element 130, but it is not limited thereto.

The invention proposes a novel communication device and a novel antenna structure therein. In comparison to the conventional design, the invention has at least the advantages of small size, wide bandwidth, low manufacturing cost, and being adaptive to different environments. Therefore, the invention is suitable for application in a variety of devices.

It should be noted that the above element sizes, element shapes, and frequency ranges are not limitations of the invention. An antenna designer can fine-tune these settings or values in order to meet specific requirements. It should be understood that the communication device of the invention is not limited to the configurations depicted in FIGS. 1-5. The invention may merely include any one or more features of any one or more embodiments of FIGS. 1-5. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

a metal mechanism element, having a slot;

a loop radiation element, coupled to the metal mechanism element;

a first radiation element, having a feeding point, and coupled to a first connection point on the loop radiation element; and a second radiation element, coupled to a second connection point on the loop radiation element, wherein the first radiation element and the second radiation element are disposed inside the loop radiation element;

wherein an antenna structure is formed by the metal mechanism element, the loop radiation element, the first radiation element, and the second radiation element;

wherein the first radiation element and the second radiation element substantially extend in opposite directions and away from each other.

2. The communication device as claimed in claim 1, wherein the metal mechanism element is a metal housing.

3. The communication device as claimed in claim 1, wherein the slot of the metal mechanism element is a closed slot.

4. The communication device as claimed in claim 1, wherein the slot of the metal mechanism element substantially has a straight-line shape.

5. The communication device as claimed in claim 1, further comprising:

a first conductive gasket, wherein the loop radiation element is coupled to the metal mechanism element through the first conductive gasket.

6. The communication device as claimed in claim 1, wherein the loop radiation element comprises a long portion and a short portion.

7. The communication device as claimed in claim 1, wherein the first radiation element substantially has an L-shape, and the second radiation element substantially has an inverted L-shape.

8. The communication device as claimed in claim 1, wherein a distance between the first radiation element and the second radiation element is from 1 mm to 2 mm.

9. The communication device as claimed in claim 6, wherein the antenna structure covers a first frequency band, a second frequency band, and a third frequency band.

10. The communication device as claimed in claim 9, wherein the first frequency band is from 2400 MHz to 2500 MHz, the second frequency band is from 5000 MHz to 6500 MHz, and the third frequency band is from 6500 MHz to 7125 MHz.

11. The communication device as claimed in claim 9, wherein a length of the slot of the metal mechanism element is substantially equal to 0.5 wavelength of the first frequency band.

12. The communication device as claimed in claim 9, wherein a total length of the first radiation element and the long portion of the loop radiation element is from 0.25 to 0.75 wavelength of the second frequency band.

13. The communication device as claimed in claim 9, wherein a total length of the first radiation element and the short portion of the loop radiation element is from 0.25 to 0.75 wavelength of the third frequency band.

14. The communication device as claimed in claim 1, further comprising:

a click pad frame, coupled to the loop radiation element.

15. The communication device as claimed in claim 14, further comprising:

a metal wall, coupled to the click pad frame, wherein the click pad frame is disposed between the metal wall and the loop radiation element.

16. The communication device as claimed in claim 15, wherein an integral molding design is formed by the click pad frame, the metal wall, the loop radiation element, the first radiation element, and the second radiation element.

17. The communication device as claimed in claim 15, further comprising:

a second conductive gasket, wherein the metal wall is coupled to the metal mechanism element through the second conductive gasket.

18. The communication device as claimed in claim 15, further comprising:

a battery element, disposed on a side of the click pad frame, wherein the battery element is adjacent to the metal wall.

19. The communication device as claimed in claim 18, wherein a height of the metal wall is greater than that of the battery element.

20. The communication device as claimed in claim 18, further comprising:

a click pad, disposed on another side of the click pad frame, wherein the click pad is adjacent to the loop radiation element.

21. A communication device, comprising:

a metal mechanism element, having a slot;

a loop radiation element, coupled to the metal mechanism element;

a first radiation element, having a feeding point, and coupled to a first connection point on the loop radiation element;

a second radiation element, coupled to a second connection point on the loop radiation element, wherein the first radiation element and the second radiation element are disposed inside the loop radiation element; and a first conductive gasket, wherein the loop radiation element is coupled to the metal mechanism element through the first conductive gasket;

wherein an antenna structure is formed by the metal mechanism element, the loop radiation element, the first radiation element, and the second radiation element.

* * * * *